US012641172B2

(12) United States Patent (10) Patent No.: US 12,641,172 B2
Yoon et al. (45) Date of Patent: May 26, 2026

(54) ELECTRONIC APPARATUS INCLUDING FIXING STRUCTURE FOR FIXING SUBSTRATE

(71) Applicant: SAMSUNG ELECTRONICS CO., LTD., Suwon-si (KR)

(72) Inventors: Hyunjoong Yoon, Suwon-si (KR); Myungsuk Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 608 days.

(21) Appl. No.: 18/163,283

(22) Filed: Feb. 2, 2023

(65) Prior Publication Data

US 2023/0188633 A1 Jun. 15, 2023

Related U.S. Application Data

(63) Continuation of application No. PCT/KR2021/010217, filed on Aug. 4, 2021.

(30) Foreign Application Priority Data

Aug. 4, 2020 (KR) ........................ 10-2020-0097665

(51) Int. Cl.
*H04M 1/02* (2006.01)
(52) U.S. Cl.
CPC ................................. *H04M 1/0277* (2013.01)
(58) Field of Classification Search
CPC . H04M 1/0277; H04M 1/0266; G06F 1/1626; G06F 1/1656; G06F 1/183;
(Continued)

(56) References Cited

U.S. PATENT DOCUMENTS 6,262,887 B1 * 7/2001 Lee ....................... G06F 1/1616
361/752
7,113,237 B2 9/2006 Nitto et al.
(Continued)

FOREIGN PATENT DOCUMENTS

JP 2014179965 A 9/2014
KR 1019970061032 A 8/1997
(Continued)

OTHER PUBLICATIONS

Korean Office Action for KR Application No. 10-2020-0097665 mailed on Nov. 19, 2024.
(Continued)

*Primary Examiner* — Ankur Jain
(74) *Attorney, Agent, or Firm* — CANTOR COLBURN LLP

(57) ABSTRACT

An electronic apparatus includes a housing, a display module disposed inside the housing and forming a portion of the surface of the electronic apparatus, a first substrate which is disposed inside the housing, and includes a first surface facing the display module and a second surface opposite to the first surface, and a fixing structure for fixing the first substrate to the housing. The fixing structure includes a first boss protruding from the inner surface of the housing toward the first substrate and defining a first screw hole, a reinforcing member disposed on the first substrate, and a screw passing through the first boss and the reinforcing member. The first boss includes a support portion, which supports a second surface of the first substrate, and an extension portion, at least a portion of which extends from the support portion and protrudes to a first surface of the first substrate.

20 Claims, 12 Drawing Sheets

(58) Field of Classification Search
CPC .......... H05K 5/00; H05K 7/14; H05K 7/1407;
H05K 5/0018
See application file for complete search history.

(56) References Cited

U.S. PATENT DOCUMENTS

| 9,317,066 | B2 | 4/2016 | Mochizuki et al. | |
|---|---|---|---|---|
| 9,538,681 | B2 | 1/2017 | Kim et al. | |
| 9,720,458 | B2 * | 8/2017 | Kang | ...................... G06F 1/203 |
| 10,034,365 | B2 | 7/2018 | Yang | |
| 10,097,227 | B2 | 10/2018 | Kang et al. | |
| 10,230,415 | B2 | 3/2019 | Kang et al. | |
| 10,567,561 | B2 | 2/2020 | Kang et al. | |
| 10,827,049 | B2 | 11/2020 | Kang et al. | |
| 11,019,187 | B2 | 5/2021 | Kang et al. | |
| 2004/0189889 | A1 * | 9/2004 | Nitto | ................ G02F 1/133308 |
| | | | | 349/58 |
| 2006/0202912 | A1 * | 9/2006 | Shin | ...................... G06F 1/1601 |
| | | | | 345/37 |
| 2014/0226292 | A1 * | 8/2014 | Mochizuki | ........... G06F 1/1635 |
| | | | | 361/752 |
| 2014/0268623 | A1 * | 9/2014 | Kim | ................... H04M 1/0249 |
| | | | | 361/809 |

| 2017/0171960 | A1 * | 6/2017 | Yang | .................... H05K 1/0216 |
|---|---|---|---|---|

FOREIGN PATENT DOCUMENTS

| KR | 1020040062729 | A | 7/2004 |
|---|---|---|---|
| KR | 100474518 | B1 | 8/2005 |
| KR | 1020060098004 | A | 9/2006 |
| KR | 100655271 | B1 | 12/2006 |
| KR | 1020070002120 | A | 1/2007 |
| KR | 1020070020718 | A | 2/2007 |
| KR | 1020110000916 | A | 1/2011 |
| KR | 1020140114096 | A | 9/2014 |
| KR | 1020150044739 | A | 4/2015 |
| KR | 1020160030018 | A | 3/2016 |
| KR | 1020160033294 | A | 3/2016 |
| KR | 1020170068938 | A | 6/2017 |
| KR | 1020190112519 | A | 10/2019 |

OTHER PUBLICATIONS

International Search Report mailed Nov. 30, 2021 for PCT/KR2021/010217.

* cited by examiner

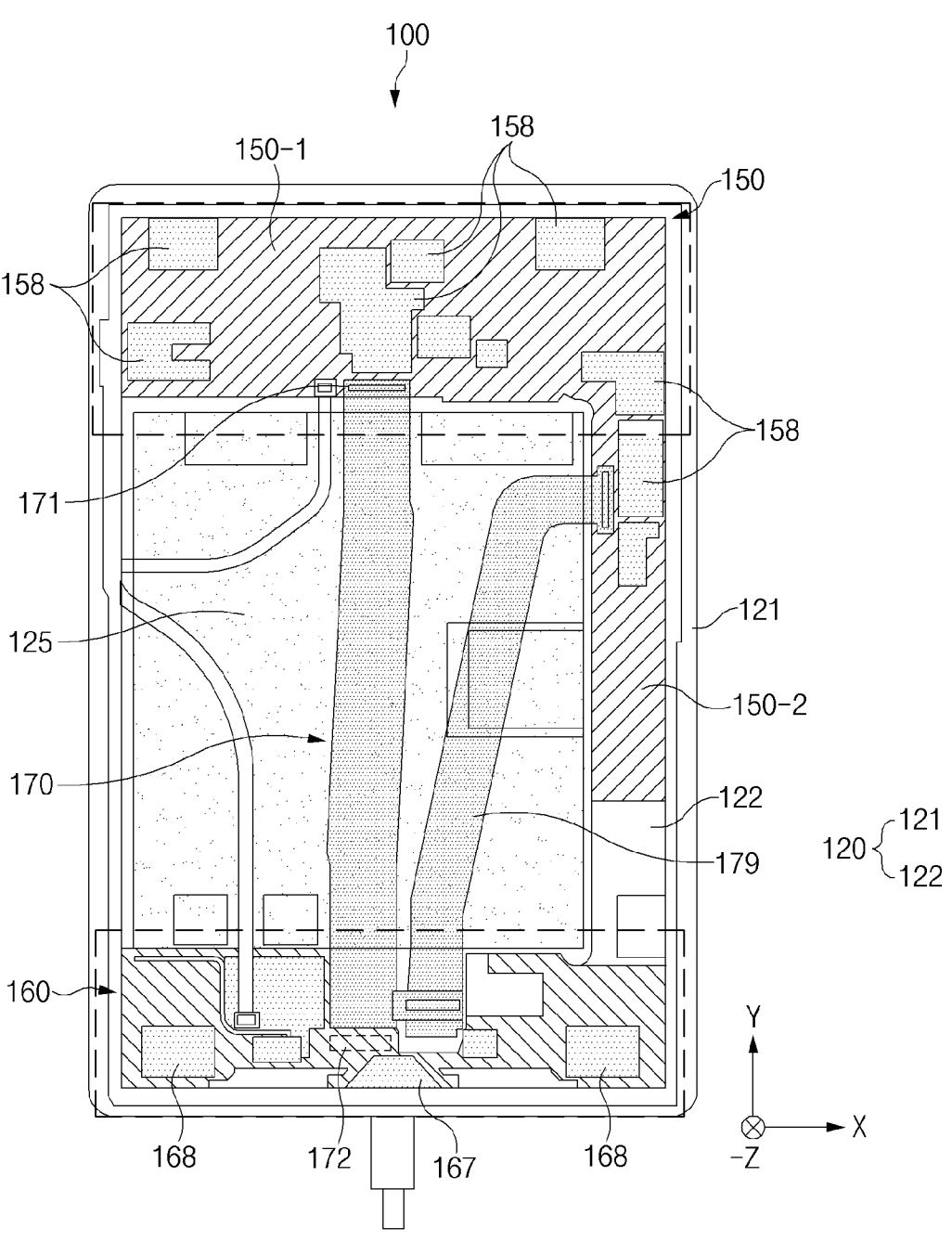
F I G . 2

ELECTRONIC APPARATUS INCLUDING FIXING STRUCTURE FOR FIXING SUBSTRATE

CROSS-REFERENCE TO RELATED APPLICATION

This application is a continuation application of International Patent Application No. PCT/KR2021/010217, Aug. 4, 2021, claiming priority to Korean Patent Application No. 10-2020-0097665, filed on Aug. 4, 2020, the content of which in its entirety is herein incorporated by reference.

TECHNICAL FIELD

Embodiments of the disclosure described herein relate to an electronic device including a fixing structure for fixing a circuit board.

BACKGROUND ART

An electronic device may include one or more circuit boards on which various electric elements for performing functions of the electronic device are disposed. The circuit boards may be fixed in the electronic device through screws. To secure mobility, a mobile electronic device may include a limited thickness and a limited inner space. A structure for efficiently disposing a circuit board in the limited inner space may be desired.

Technical Problem

The circuit board may be coupled to a structure of the electronic device through a screw. Coupling stiffness of the screw coupling may be proportional to a coupling length of the screw. Due to the limited inner space of the electronic device, a coupling length sufficient to fix the circuit board may not be provided. In this case, the circuit board may be vulnerable to external impact. Alternatively, another screw having a short coupling length may be used, but may be loosened as time passes. Furthermore, in a case in which the electronic device includes a plurality of circuit boards, bosses of the housing for fixing the respective circuit boards may have different lengths (screw coupling lengths). In this case, fixing forces for the respective circuit boards may differ from one another.

Embodiments of the disclosure provide an electronic device including a circuit board fixing structure for providing a firm coupling of a circuit board and a housing in a limited inner space.

Technical Solution

An electronic device in an embodiment of the disclosure includes a housing, a display module that is disposed in the housing and that constitutes a portion of a surface of the electronic device, a first circuit board that is disposed in the housing and that includes a first surface that faces toward the display module and a second surface opposite to the first surface, and a fixing structure that fixes the first circuit board to the housing. The fixing structure includes a first boss that protrudes from an inner surface of the housing toward the first circuit board and that defines a first screw hole, a reinforcing member disposed on the first circuit board, and a screw that penetrates the first boss and the reinforcing member. The first boss includes a support portion that supports the second surface of the first circuit board and an extending portion that extends from the support portion such that at least part of the extending portion protrudes from the first surface of the first circuit board. The reinforcing member presses the first surface of the circuit board.

An electronic device in an embodiment of the disclosure includes a housing, a display module that is disposed in the housing and that constitutes a portion of a surface of the electronic device, a first circuit board that is disposed in the housing and that includes a first surface that faces toward the display module and a second surface opposite to the first surface, and a fixing structure that fixes the first circuit board to the housing. The fixing structure includes a first boss that protrudes from an inner surface of the housing toward the first circuit board and defines a first screw hole, a reinforcing member that is disposed on the first surface of the first circuit board and that defines a first hole that at least partially overlaps the first screw hole of the first boss in a plan view, and a screw that passes through the first screw hole and the first hole. The screw is configured such that a head presses the reinforcing member.

An electronic device in an embodiment of the disclosure includes a housing, a display module that is disposed in the housing and that constitutes a portion of a surface of the electronic device, a first circuit board that is disposed in the housing and that includes a first surface that faces toward the display module and a second surface opposite to the first surface, a first through-hole that penetrates the first surface and the second surface being defined in the first circuit board, and a fixing structure that fixes the first circuit board to the housing. The fixing structure includes a first boss that protrudes from an inner surface of the housing toward the first circuit board and supports at least a partial region of the second surface of the first circuit board, a reinforcing member disposed on the first surface of the first circuit board, and a screw. A first screw hole at least partially aligned with the first through-hole is defined in the first boss. A first hole at least partially aligned with the first through-hole and smaller than the first through-hole is defined in the reinforcing member. The screw is fastened to the first hole and the first screw hole.

Advantageous Effects

In the electronic device in the embodiments of the disclosure, a circuit board having a relatively small gap from the housing may be firmly coupled to the housing. Furthermore, in the electronic device in the embodiments of the disclosure, similar fixing forces may be provided for a plurality of circuit boards.

In addition, the disclosure may provide various effects that are directly or indirectly recognized.

DESCRIPTION OF DRAWINGS

FIG. 2 is a plan view of an embodiment of the electronic device.

With regard to description of the drawings, identical or similar reference numerals may be used to refer to identical or similar components.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein may be variously made without departing from the scope and spirit of the disclosure.

Figure 1A:
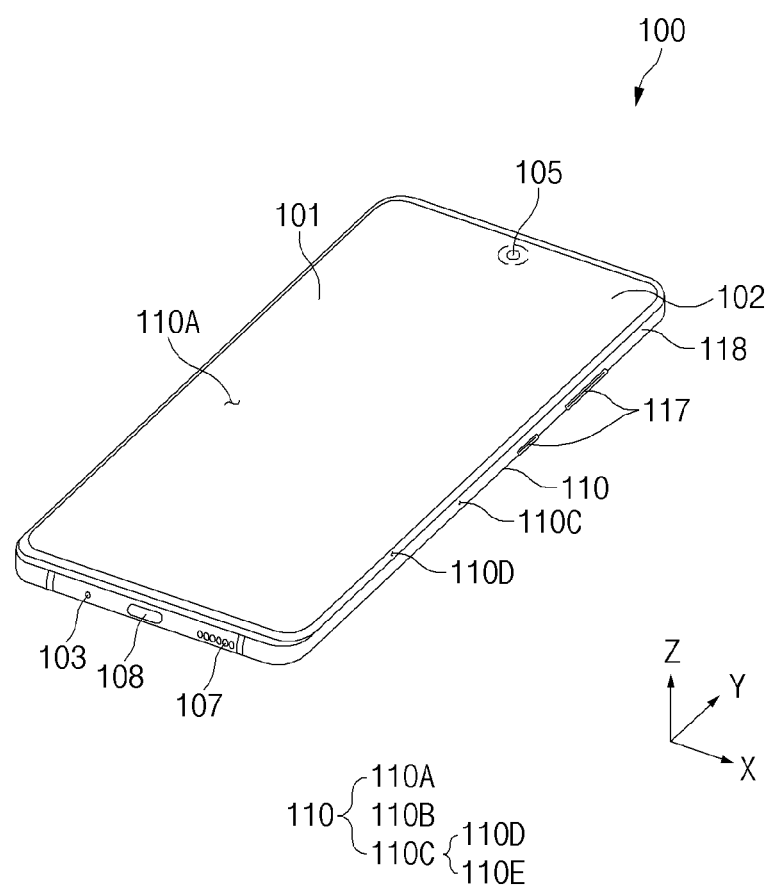
FIG. 1A is a front perspective view of an embodiment of an electronic device.
Figure 1B:
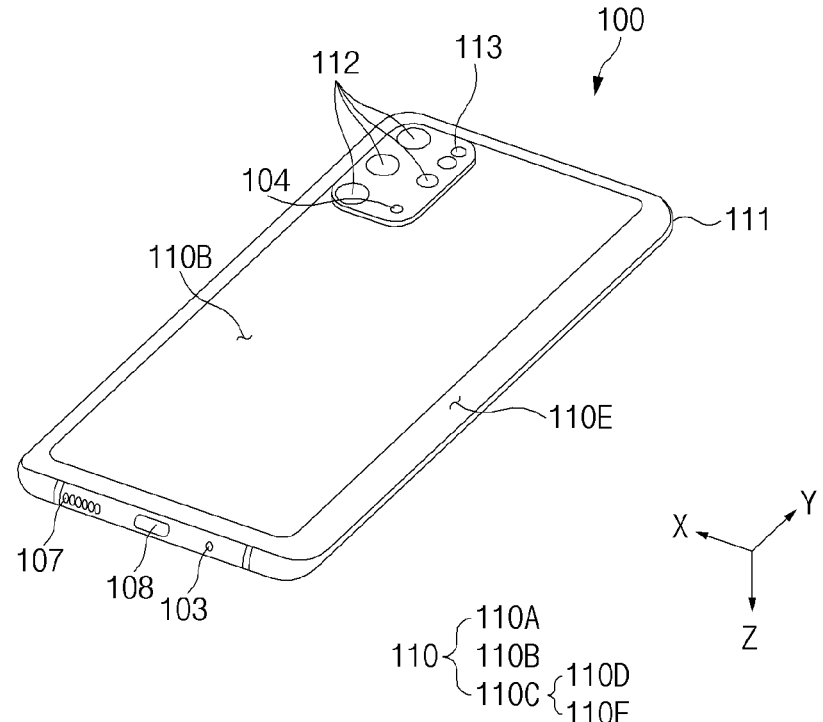
FIG. 1B is a rear perspective view of an embodiment of the electronic device.

FIG. 1A is a front perspective view of an embodiment of an electronic device. FIG. 1B is a rear perspective view of an embodiment of the electronic device.

Referring to FIGS. 1A and 1B, the electronic device 100 may include a housing 110 that includes a first surface (or, a front surface) 110A, a second surface (or, a rear surface) 110B, and a side surface 110C surrounding a space between the first surface 110A and the second surface 110B. In another embodiment (not illustrated), the housing 110 may refer to a structure that forms some of the first surface 110A, the second surface 110B, and the side surface 110C.

In an embodiment, the first surface 110A may be formed by a front plate 102, at least a portion of which is substantially transparent (e.g., a glass plate including various coating layers, or a polymer plate). The second surface 110B may be formed by a back plate 111 that is substantially opaque. The back plate 111 may include or consist of coated or colored glass, ceramic, a polymer, metal (e.g., aluminum, stainless steel (STS), or magnesium), or a combination of at least two of the aforementioned materials, for example. The side surface 110C may be formed by a side bezel structure (or a "frame structure") 118 that is coupled with the front plate 102 and the back plate 111 and that includes metal and/or a polymer. In another embodiment, the back plate 111 and the side bezel structure 118 may be unitary with each other as one body and may include the same material (e.g., a metallic material such as aluminum).

In the illustrated embodiment, the front plate 102 may include two first regions 110D that curvedly and seamlessly extend from partial regions of the first surface 110A toward the back plate 111. The first regions 110D may be disposed at opposite long edges of the front plate 102.

In the illustrated embodiment, the back plate 111 may include two second regions 110E that curvedly and seamlessly extend from partial regions of the second surface 110B toward the front plate 102. The second regions 110E may be disposed at opposite long edges of the back plate 111.

In another embodiment, the front plate 102 (or the back plate 111) may include only one of the first regions 110D (or the second regions 110E). Furthermore, in another embodiment, the front plate 102 (or the back plate 111) may not include a part of the first regions 110D (or the second regions 110E).

In the embodiments, when viewed from a side of the electronic device 100, the side bezel structure 118 may have a first thickness (or width) at sides not including the first regions 110D or the second regions 110E and may have a second thickness at sides including the first regions 110D or the second regions 110E. The second thickness may be smaller than the first thickness.

In an embodiment, the electronic device 100 may include at least one of a display (e.g., display panel) 101, audio modules 103, 104, and 107, a sensor module (not illustrated), camera modules 105, 112, and 113, key input devices 117, or a light-emitting element (not illustrated). A connector hole 108 may be defined in the electronic device 100. In another embodiment, at least one component (e.g., the key input devices 117 or the light-emitting element (not illustrated)) among the aforementioned components may be omitted from the electronic device 100, or other component(s) may be additionally included in the electronic device 100.

In an embodiment, the display 101 may be visually exposed through most of the front plate 102. In an embodiment, at least a portion of the display 101 may be visually exposed through the front plate 102 that includes the first surface 110A and the first regions 110D of the side surface 110C, for example.

In an embodiment, the periphery of the display 101 may be substantially the same as the shape of the adjacent outside edge of the front plate 102. In another embodiment (not illustrated), to expand the area by which the display 101 is exposed, the gap between the periphery of the display 101 and the periphery of the front plate 102 may be substantially constant.

In an embodiment, a surface of the housing 110 (or the front plate 102) may include a display area that is formed as the display 101 is visually exposed. In an embodiment, the display area may include the first surface 110A and the first regions 110D of the side surface, for example.

In an embodiment, a recess or opening may be defined in a portion of the screen display area of the display 101, and the electronic device 100 may include at least one of an audio module, a sensor module, the camera module 105, or a light-emitting element that is aligned with the recess or opening. In an embodiment, the electronic device 100 may include, on a rear surface of the screen display area of the display 101, at least one of the audio module, the sensor module, the camera module 105, or the light-emitting element.

In another embodiment (not illustrated), the first and second surfaces (also referred to as display areas) 110A and 110D may include a sensing region (not illustrated) that obtains biometric information of a user. Here, when the display areas 110A and 110D includes the sensing region, this may mean that at least a portion of the sensing region overlaps the display areas 110A and 110D. In an embodiment, the sensing region (not illustrated) may refer to a region capable of displaying visual information by the display 101 like the other regions of the display areas 110A and 110D and additionally obtaining biometric information (e.g., a fingerprint) of the user, for example.

In another embodiment (not illustrated), the display 101 may be coupled with, or disposed adjacent to, touch detection circuitry, a pressure sensor capable of measuring the intensity (pressure) of a touch, and/or a digitizer that detects a stylus pen of a magnetic field type.

In an embodiment, the microphone holes 103 and 104 and the speaker hole 107 may be defined in the audio modules 103, 104, and 107.

In an embodiment, the microphone holes 103 and 104 may include the first microphone hole 103 defined in a partial region of the side surface 110C and the second microphone hole 104 defined in a partial region of the second surface 110B. A microphone for obtaining external sound may be disposed in the microphone holes 103 and 104. The microphone may include a plurality of microphones to sense the direction of sound. In an embodiment, the second microphone hole 104 defined in the partial region of the second surface 110B may be disposed adjacent to the camera modules 105, 112, and 113. In an embodiment, the second microphone hole 104 may obtain sounds when the camera modules 105, 112, and 113 are executed, or may obtain sounds when other functions are executed, for example.

In an embodiment, the speaker hole 107 may include an external speaker hole 107 and a receiver hole for telephone call (not illustrated). The external speaker hole 107 may be defined in a portion of the side surface 110C of the electronic device 100. In another embodiment, the external speaker hole 107, together with the first microphone hole 103, may be implemented as a single hole. Although not illustrated, the receiver hole for telephone call (not illustrated) may be defined in another portion of the side surface 110C. In an embodiment, the receiver hole for telephone call (not illustrated) may be defined in another portion (e.g., a portion facing the +Y-axis direction) of the side surface 110C that faces the portion (e.g., a portion facing the −Y-axis direction) of the side surface 110C in which the external speaker hole 107 is defined, for example.

In an embodiment, the electronic device 100 may include a speaker in communication with the speaker hole 107. In another embodiment, the speaker may include a piezoelectric speaker that does not include the speaker hole 107.

In an embodiment, the sensor module (not illustrated) may generate an electrical signal or a data value that corresponds to an operational state inside the electronic device 100 or an environmental state external to the electronic device 100. In an embodiment, the sensor module may include at least one of a proximity sensor, a heart rate monitor (HRM) sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor, for example.

In an embodiment, the key input devices 117 may be disposed on the side surface 110C (e.g., the first regions 110D and/or the second regions 110E) of the housing 110. In another embodiment, the electronic device 100 may not include all or some of the key input devices 117, and the key input devices 117 not included may be implemented in a different form, such as a soft key, on the display 101. In another embodiment, the key input devices may include a sensor module (not illustrated) that forms the sensing region (not illustrated) that is included in the display areas 110A and 110D.

In an embodiment, the connector hole 108 may accommodate a connector. The connector hole 108 may be defined in the side surface 110C of the housing 110. In an embodiment, the connector hole 108 may be defined in the side surface 110C so as to be adjacent to at least a part of the audio modules (e.g., the first microphone hole 103 and the speaker hole 107), for example. In another embodiment, the first connector hole 108 capable of accommodating a connector (e.g., a universal serial bus (USB) connector) for transmitting/receiving power and/or data with an external electronic device, and/or a second connector hole (not illustrated) capable of accommodating a connector (e.g., an earphone jack) for transmitting/receiving an audio signal with an external electronic device may be defined in the electronic device 100.

In an embodiment, the electronic device 100 may include the light-emitting element (not illustrated). In an embodiment, the light-emitting element (not illustrated) may be disposed on the first surface 110A of the housing 110, for example. The light-emitting element (not illustrated) may provide state information of the electronic device 100 in the form of light. In another embodiment, the light-emitting element (not illustrated) may provide a light source that operates in conjunction with operation of the first camera module 105. In an embodiment, the light-emitting element (not illustrated) may include a light-emitting diode (LED), an IR LED, and/or a xenon lamp, for example.

In an embodiment, the camera modules 105, 112, and 113 may include the first camera module 105 (e.g., an under display camera) which receives light through a camera region of the first surface 110A of the electronic device 100, the second camera module 112 exposed on the second surface 110B, and/or the flash 113.

Figure 1C:
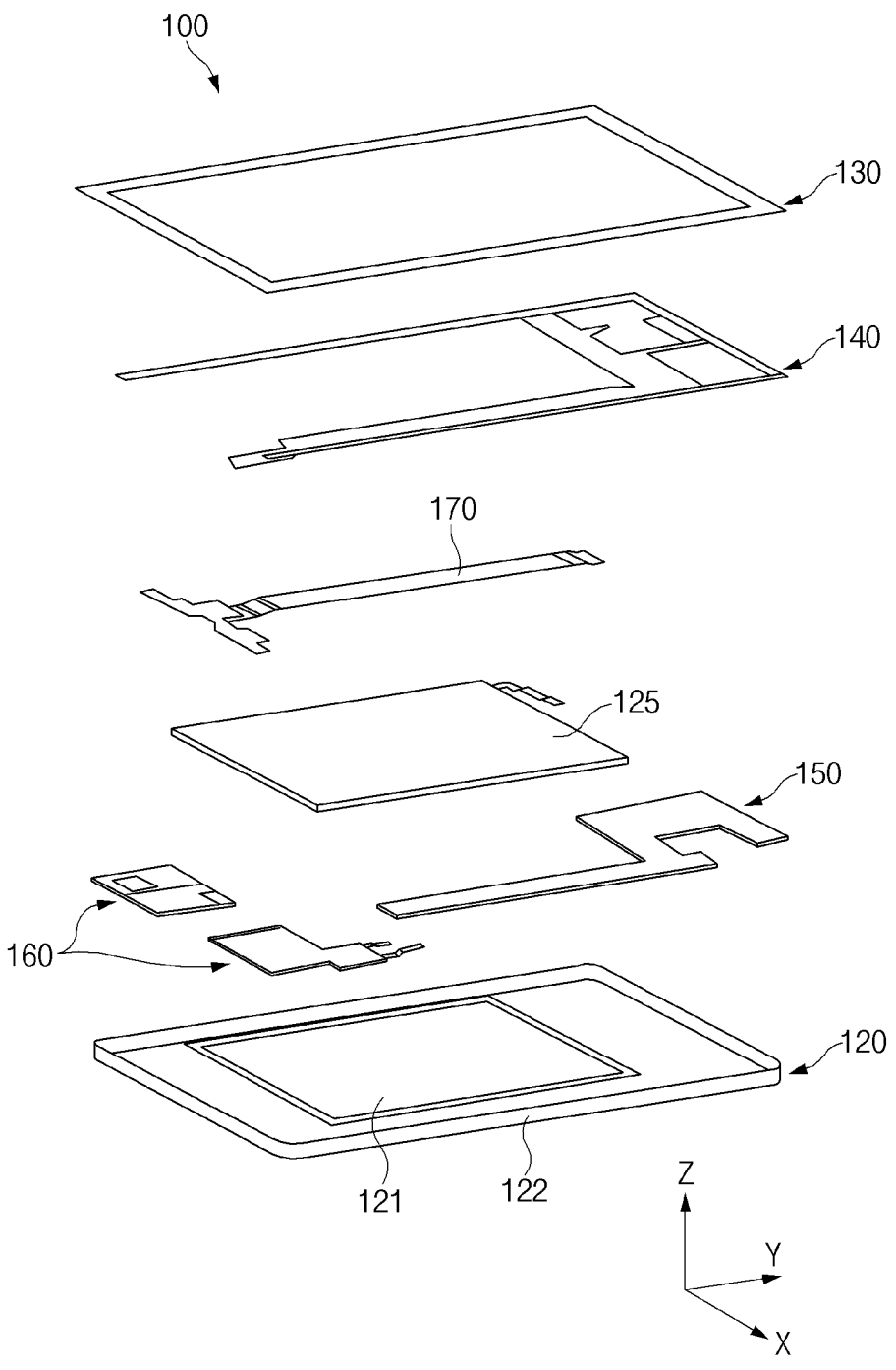
FIG. 1C is an exploded perspective view of an embodiment of the electronic device.

FIG. 1C is an exploded perspective view of an embodiment of the electronic device.

Referring to FIG. 1C, the electronic device 100 may include a display module 130 (e.g., the display 101 of FIG. 1A), an inner structure 140, a battery 125, a first circuit board 150, a second circuit board 160, a flexible circuit board 170, and a housing 120 (e.g., the housing 110 of FIGS. 1A and 1B). In another embodiment, the electronic device 100 may not include at least one of the aforementioned components, or may additionally include other component(s). At least one of the components of the electronic device 100 may be identical or similar to at least one of the components of the electronic device 100 of FIGS. 1A and 1B, and repetitive descriptions will hereinafter be omitted.

In an embodiment, the housing 120 may include a plate structure 121 and a frame structure 122 surrounding the plate structure 121. The first circuit board 150, the second circuit board 160, and/or the battery 125 may be disposed on the plate structure 121. The plate structure 121 may be unitary with the frame structure 122 as one body, or may be connected to the frame structure 122 so as to be detachable. The housing 120 may include or consist of a metallic material and/or a non-metallic (e.g., polymer) material, for example.

In an embodiment, the first circuit board 150 and the second circuit board 160 may be disposed on the plate structure 121. The first circuit board 150 and the second circuit board 160 may be spaced apart from each other. The battery 125 may be disposed between the first circuit board 150 and the second circuit board 160. The first circuit board 150 and the second circuit board 160 may be electrically connected through the flexible circuit board 170. The flexible circuit board 170 may extend into a space between the battery 125 and the display module 130 and/or a space between the battery 125 and the plate structure 121.

In an embodiment, a processor, a memory, and/or an interface may be disposed (e.g., mounted) on the first circuit board 150 or the second circuit board 160. The processor may include one or more of a central processing unit, an application processor, a graphic processing unit, an image signal processor, a sensor hub processor, or a communication processor, for example. The memory may include a volatile memory or a non-volatile memory, for example.

In an embodiment, the interface may include a high definition multimedia interface (HDMI), a USB interface, a secure digital (SD) card interface, and/or an audio interface, for example. In an embodiment, the interface may electrically or physically connect the electronic device 100 with an external electronic device and may include a USB connector, an SD card/MultiMediaCard (MMC) connector, or an audio connector, for example. In an embodiment, the interface may be disposed on the second circuit board 160.

In an embodiment, the battery 125 may supply power to at least one of the components of the electronic device 100. In an embodiment, the battery 125 may include a primary cell that is not rechargeable, a secondary cell that is rechargeable, or a fuel cell, for example. In an embodiment, at least a portion of the battery 125 may be disposed on substantially the same plane as those of the first circuit board 150 and the second circuit board 160. In an embodiment, the battery 125 may be integrally disposed inside the electronic device 100, or may be disposed so as to be detachable from the electronic device 100.

FIG. 2 is a plan view of an embodiment of the electronic device. FIG. 2 is a view in which the display module is omitted from the electronic device illustrated in FIG. 1C.

Referring to FIG. 2, the electronic device 100 may include the housing 120, the first circuit board 150, the second circuit board 160, the flexible circuit board 170, and the battery 125. The housing 120 may include the plate structure 121 and the frame structure 122 surrounding the plate structure 121. The first circuit board 150, the second circuit board 160, and/or the battery 125 may be disposed on the plate structure 121.

In an embodiment, the first circuit board 150 may include a first portion 150-1 disposed in the +y-axis direction with respect to the battery 125 and a second portion 150-2 extending from the first portion 150-1 in the –y-axis direction. The first portion 150-1 may be spaced apart from the second circuit board 160 with the battery 125 therebetween. The second portion 150-2 may extend along an edge of the electronic device 100 that faces the y-axis direction. The first circuit board 150 may be disposed adjacent to a battery frame 129 surrounding the battery 125. One or more first electric elements 158 may be disposed on the first circuit board 150. The first circuit board 150 may be electrically connected with the second circuit board 160 through the flexible circuit board 170.

In an embodiment, the second circuit board 160 may be disposed in the –y-axis direction with respect to the battery 125. One or more second electric elements 168 may be disposed on the second circuit board 160. The second electric elements 168 may include an external interface module 167. In an embodiment, the external interface module 167 may include a USB connection module and/or an earphone insertion terminal, for example. The second circuit board 160 may be electrically connected with the first circuit board 150 through the flexible circuit board 170.

In an embodiment, the flexible circuit board 170 may electrically connect the first circuit board 150 and the second circuit board 160. The flexible circuit board 170 may extend from the first circuit board 150 to the second circuit board 160 across the battery 125. The flexible circuit board 170 may include a first connector 171 coupled to the first circuit board 150 and a second connector 172 coupled to the second circuit board 160.

In various embodiments, when viewed in the z-axis direction, at least a portion of the flexible circuit board 170 may be hidden by the second circuit board 160. In an embodiment, the second connector 172 of the flexible circuit board 170 may overlap the second circuit board 160, for example.

In various embodiments, the flexible circuit board 170 may further include an additional flexible circuit board 179. In an embodiment, the additional flexible circuit board 179 may connect the second portion 150-2 of the first circuit board 150 and the second circuit board 160, for example.

Figure 3A:
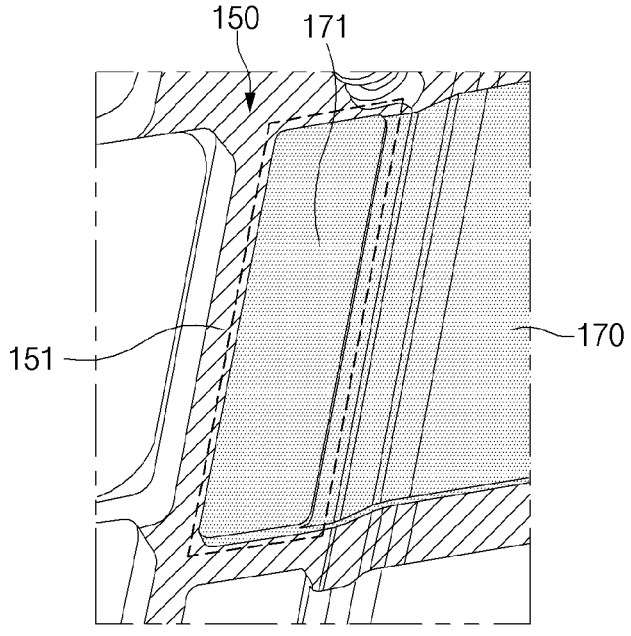
FIG. 3A is an enlarged view of a portion of the electronic device of FIG. 2.
Figure 3B:
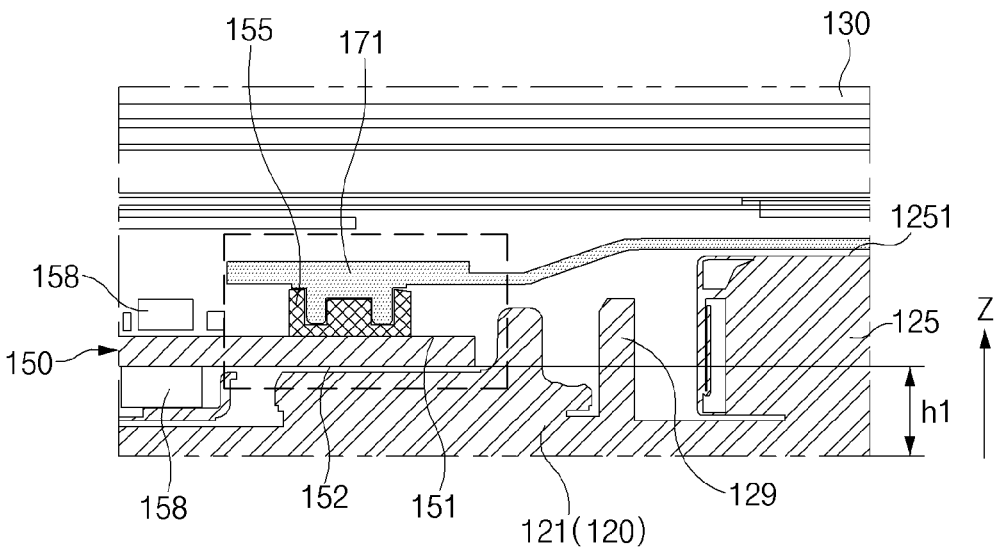
FIG. 3B is a cross-sectional view of an embodiment of the electronic device.

FIG. 3A is an enlarged view of a portion of the electronic device of FIG. 2, and FIG. 3B is a cross-sectional view of an embodiment of the electronic device. FIGS. 3A and 4B are views illustrating a coupling of the flexible circuit board and the first circuit board.

Referring to FIG. 3B, the display module 130 may form the front surface of the electronic device 100. The plate structure 121 of the housing 120 may form the rear surface of the electronic device 100, or may be disposed in the inner space of the electronic device 100. The front surface of the electronic device 100 may include a surface facing the +z-axis direction. The rear surface of the electronic device 100 may include a surface facing the –z-axis direction.

In an embodiment, the first circuit board 150 may be disposed on the plate structure 121 of the housing 120. In an embodiment, the first circuit board 150 may be disposed between the display module 130 and the plate structure 121, for example. The first circuit board 150 may be disposed adjacent to the battery frame 129 surrounding the battery 125.

In an embodiment, the first circuit board 150 may include a first surface 151 facing toward the display module 130 and a second surface 152 opposite to the first surface 151. In an embodiment, the second surface 152 may be a surface facing toward the plate structure 121 of the housing 120, for example. The first circuit board 150 may include, on the first surface 151 thereof, a first corresponding connector 155 to which the first connector 171 of the flexible circuit board 170 is coupled. The first circuit board 150 may be electrically connected with the flexible circuit board 170 through a physical coupling of the first corresponding connector 155 and the first connector 171 of the flexible circuit board 170. The first electric elements 158 may be disposed on the first surface 151 and/or the second surface 152. In an embodiment, the first circuit board 150 may be disposed at a first height h1 from the plate structure 121 of the housing 120 or the rear surface of the electronic device 100.

In an embodiment, the flexible circuit board 170 may include the first connector 171 coupled with the first corresponding connector 155. The first connector 171 may be formed on one end portion of the flexible circuit board 170. The flexible circuit board 170 may extend from the first surface 151 of the first circuit board 150 into the space between the battery 125 and the display module 130. In an embodiment, at least a portion of the flexible circuit board 170 may be disposed on an upper surface 1251 of the battery 125, for example. The flexible circuit board 170 may extend toward the second circuit board 160.

Figure 4A:
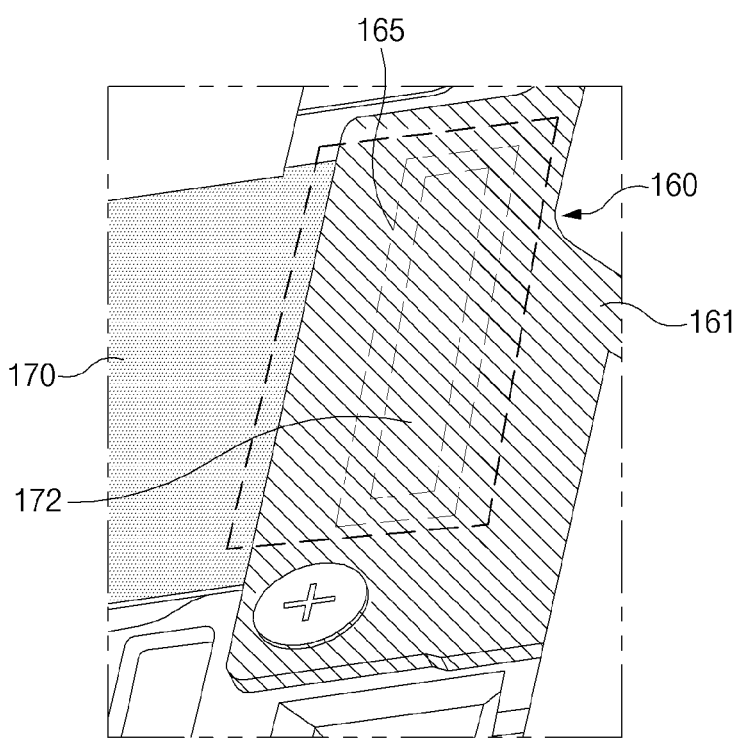
FIG. 4A is an enlarged view of a portion of the electronic device of FIG. 2.
Figure 4B:
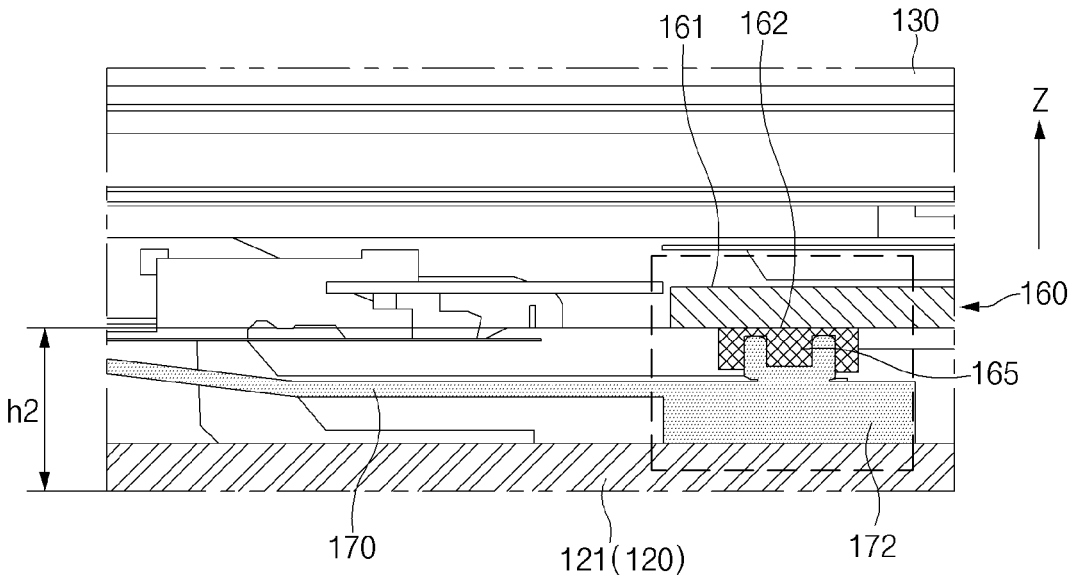
FIG. 4B is a cross-sectional view of an embodiment of the electronic device.

FIG. 4A is an enlarged view of a portion of the electronic device of FIG. 2, and FIG. 4B is a cross-sectional view of an embodiment of the electronic device. FIGS. 4A and 4B are views illustrating a coupling of the flexible circuit board and the second circuit board.

In an embodiment, the second circuit board 160 may be disposed on the plate structure 121 of the housing 120. In an embodiment, the second circuit board 160 may be disposed between the display module 130 and the plate structure 121 of the housing 120, for example.

In an embodiment, the second circuit board 160 may include a first surface 161 facing toward the display module 130 and a second surface 162 opposite to the first surface 161. In an embodiment, the second surface 162 may be a surface facing toward the plate structure 121 of the housing 120, for example. The second circuit board 160 may include, on the second surface 162 thereof, a second corresponding connector 165 to which the second connector 172 of the flexible circuit board 170 is coupled. The second circuit board 160 may be electrically connected with the flexible circuit board 170 through a physical coupling of the second corresponding connector 165 and the second connector 172 of the flexible circuit board 170. The second electric elements (e.g., the second electric elements 168 of FIG. 2) may be disposed on the first surface 161 and/or the second surface 162. In an embodiment, the second circuit board 160 may be disposed at a second height h2 from the plate structure 121 of the housing 120 or the rear surface of the electronic device 100.

In an embodiment, referring to FIGS. 3B and 4B together, the second height h2 may be greater than the first height h1. In an embodiment, the second circuit board 160 may be disposed closer to the display module 130 than the first circuit board 150 is, for example. In an embodiment, a space between the first surface 161 of the second circuit board 160 and the display module 130 may not be sufficiently large to accommodate the second connector 172 of the flexible circuit board 170, for example. Accordingly, the second corresponding connector 165 may be disposed on the second surface 162 of the second circuit board 160 to secure a space in which the second connector 172 of the flexible circuit board 170 is able to be coupled thereto.

In an embodiment, the flexible circuit board 170 may include the second connector 172 coupled with the second corresponding connector 165. The second connector 172 may be formed on one end portion of the flexible circuit board 170. The flexible circuit board 170 may extend from the second surface 162 of the second circuit board 160 toward the first circuit board 150. Although not illustrated, the flexible circuit board 170 may extend from the second surface 162 of the second circuit board 160 to the first circuit board 150 through the space between the display module 130 and the battery 125.

Referring to FIGS. 3B and 4B, the first circuit board 150 may be spaced apart from the display module 130 by a first gap in the –z-axis direction, and the second circuit board 160 may be spaced apart from the display module 130 by a second gap smaller than the first gap in the –z-axis direction.

The heights h1 and h2 illustrated in FIGS. 3B and 4B and the difference between the gaps may be related to the first electric elements 158 disposed on the first circuit board 150 and the second electric elements 168 disposed on the second circuit board 160. In an embodiment, some of the first electric elements 158 may be disposed on the first surface 151 of the first circuit board 150, and the first circuit board 150 may be disposed closer to the plate structure in a case in which the some of the first electric elements 158 have a relatively large height in the z-axis direction, for example. Likewise, some of the second electric elements 168 may be disposed on the second surface 162 of the second circuit board 160, and the second circuit board 160 may be disposed farther away from the plate structure 121 in a case in which the some of the second electric elements 168 have a relatively large height in the –z-axis direction.

In an embodiment, it has been described that the first electric elements 158 are disposed on the first surface 151 of the first circuit board 150 and the second electric elements 168 are disposed on the second surface 162 of the second circuit board 160. However, the disclosure is not limited thereto. In an embodiment, the first electric elements 158 may be disposed on the first surface 151 and/or the second surface 152 of the first circuit board 150, for example. In an embodiment, the second electric elements 168 may be disposed on the first surface 161 and/or the second surface 162 of the second circuit board, for example.

In various embodiments, the first electric elements 158 and the second electric elements 168 may refer to various components that are attached to the circuit boards 150 and 160, or disposed on the circuit boards 150 and 160 through surface mount technology (SMT). In an embodiment, the first connector 171 may be included in the first electric elements 158, for example. In an embodiment, the second connector 172 may be included in the second electric elements 168, for example.

Figure 5A:
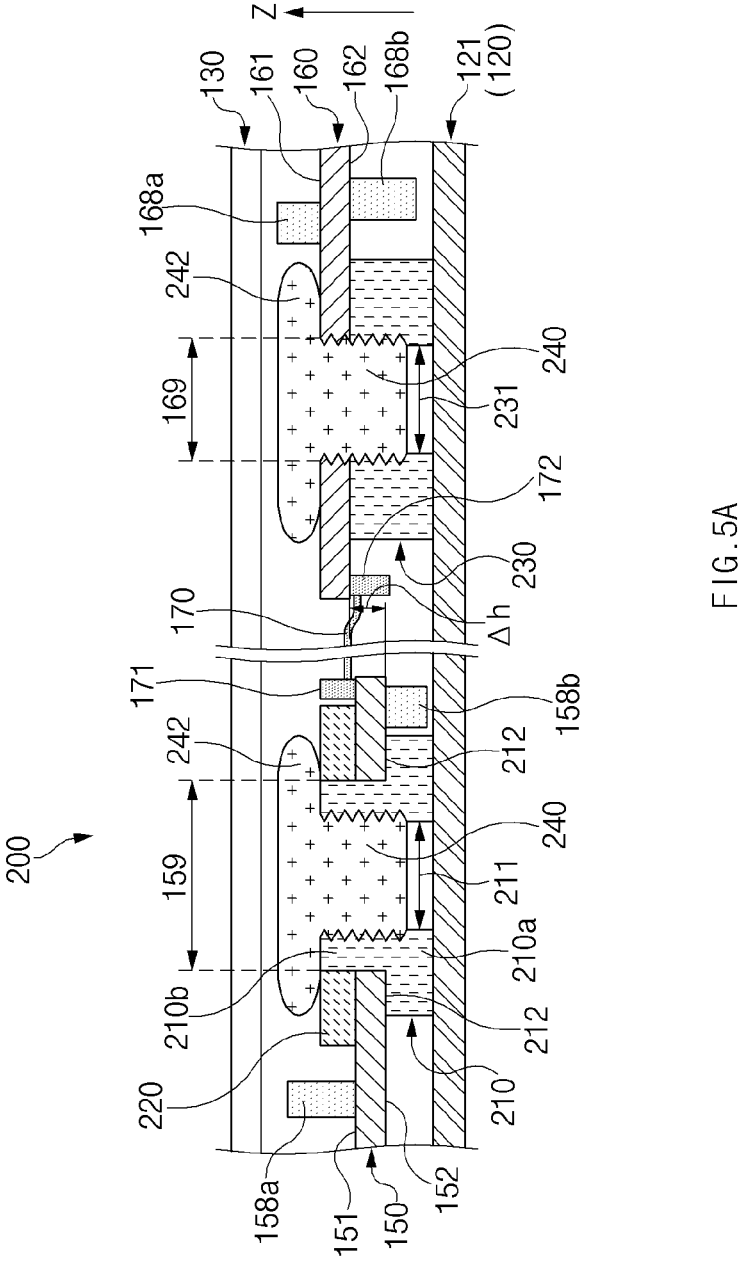
FIG. 5A is a view illustrating an embodiment of a fixing structure of the electronic device.
Figure 5B:
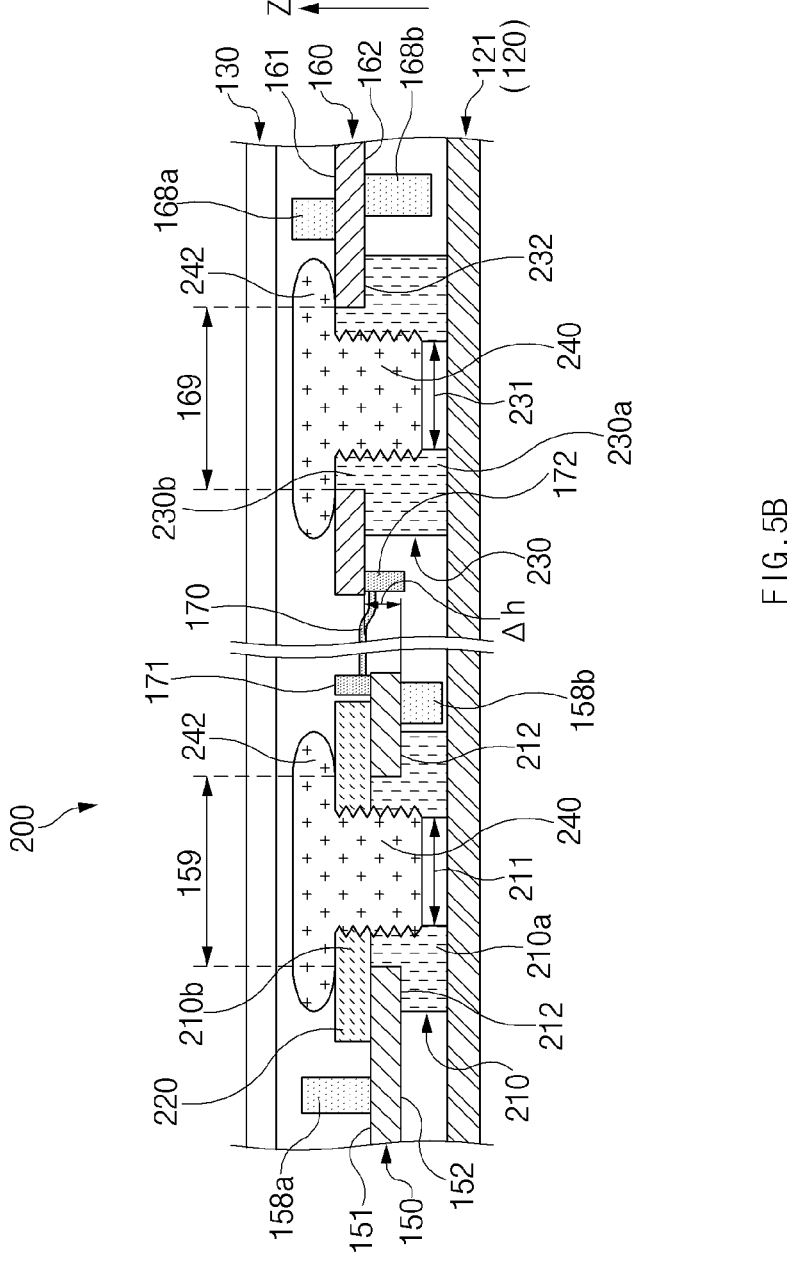
FIG. 5B is a view illustrating an embodiment of the fixing structure of the electronic device.
Figure 6A:
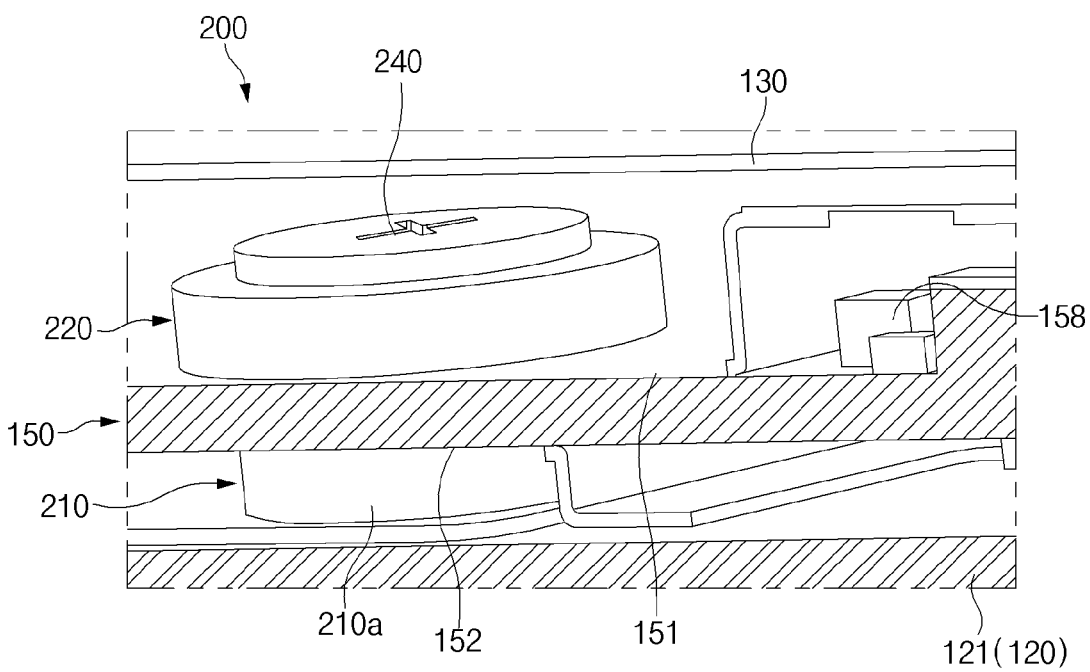
FIGS. 6A and 6B are views illustrating an embodiment of the fixing structure of the electronic device.
Figure 6B:
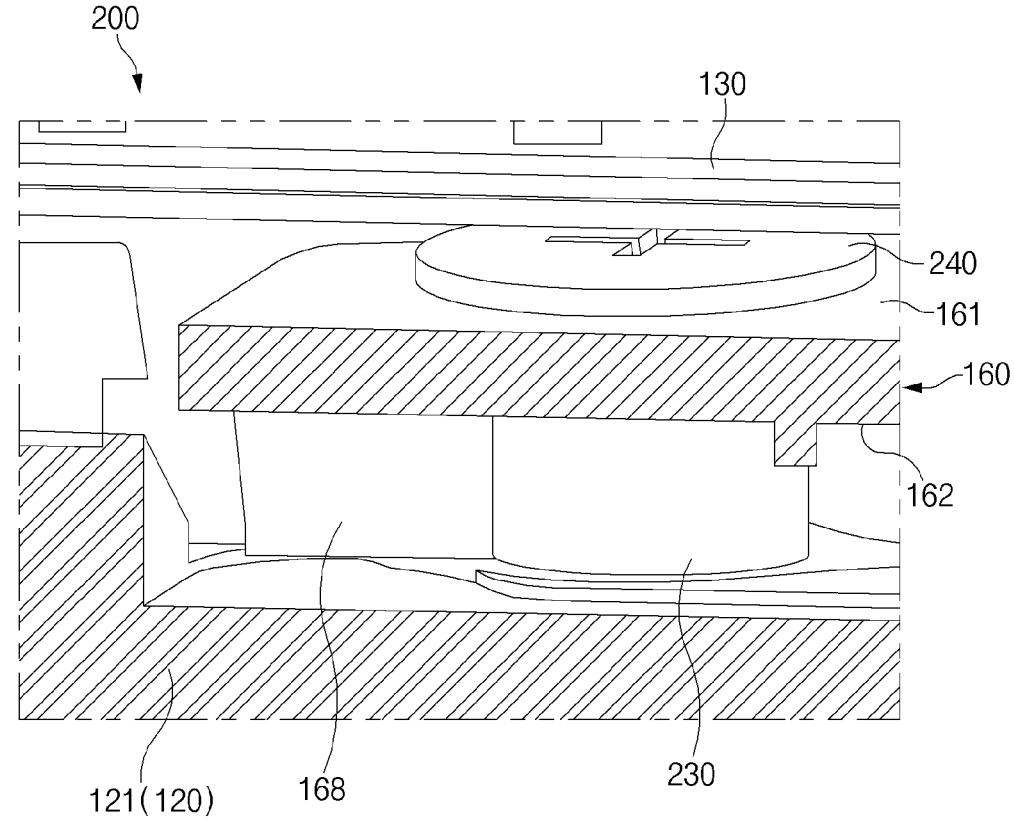

FIG. 5A is a view illustrating an embodiment of a fixing structure of the electronic device. FIG. 5B is a view illustrating an embodiment of the fixing structure of the electronic device. FIGS. 6A and 6B are views illustrating an embodiment of the fixing structure of the electronic device.

In an embodiment, the electronic device 100 may include the fixing structure 200 for fixing the first circuit board 150 and the second circuit board 160 to the plate structure 121 of the housing 120.

In an embodiment, the fixing structure 200 may include bosses 210 and 230 protruding from the plate structure 121 of the housing 120, a reinforcing member 220, and screws 240 coupled to the bosses 210 and 230. In an embodiment, the bosses 210 and 230 may include the first boss 210 coupled to the first circuit board 150 and the second boss 230 coupled to the second circuit board 160.

In an embodiment, the first boss 210 may protrude from the plate structure 121 of the housing 120 toward the first circuit board 150. The first boss 210 may be unitary with the plate structure 121 of the housing 120 as one body, or may be coupled to the plate structure 121. In an embodiment, a first screw hole 211 into which at least a portion of a screw 240 is inserted may be defined in the first boss 210. Corresponding threads that correspond to threads of the screw 240 may be formed on the inner surface of the first screw hole 211. In an embodiment, the first screw hole 211 of the first boss 210 may penetrate an extending portion 210b and at least part of a support portion 210a.

In an embodiment, the first boss 210 may include the support portion 210a supporting the second surface 152 of the first circuit board 150 and the extending portion 210b passing through a first through-hole 159 of the first circuit board 150 from the support portion 210a. In an embodiment, a size of the support portion 210a may be larger than a size of the extending portion 210b.

In an embodiment, the extending portion 210b may be formed in a size corresponding to the first through-hole 159, and a size of the support portion 210a may be larger than a size of the first through-hole 159 of the first circuit board 150, for example. The extending portion 210b may extend from the support portion 210a with a step. A stepped surface 212 may be formed on the support portion 210a. In an embodiment, the stepped surface 212 may support the second surface 152 of the first circuit board 150, for example.

Referring to FIG. 5A, in an embodiment, the extending portion 210b may pass through the first through-hole 159 and may further protrude in the Z-axis direction when viewed from the first surface 151 of the first circuit board 150. The reinforcing member 220 may be coupled to the extending portion 210*b*. In an embodiment, at least part of the extending portion 210*b* may penetrate the reinforcing member 220, for example. In an embodiment, the extending portion 210*b* may be surrounded by the reinforcing member 220, for example.

Referring to FIG. 5B, unlike in FIG. 5A, the extending portion 210*b* may be disposed in the first through-hole 159 so as not protrude from the first surface 151 of the first circuit board 150. In an embodiment, the extending portion 210*b* illustrated in FIG. 5B may be a guide for temporarily fixing the position of the first circuit board 150 before the screw 240 is fastened, for example. In various embodiments, the extending portion 210*b* may form the same plane as that of the first surface 151 of the first circuit board 150. The reinforcing member 220 may be disposed on the same plane.

In an embodiment, the reinforcing member 220 may be disposed on the first surface 151 of the first circuit board 150. A hole (e.g., a hole 221 of FIGS. 7A and 7B) at least partially aligned with the first through-hole 159 of the first circuit board 150 may be defined in the reinforcing member 220. The extending portion 210*b* of the first boss 210 may extend into the hole 221 of the reinforcing member 220. In an embodiment, the reinforcing member 220 may be disposed on the first surface 151 of the first circuit board 150 such that the hole (e.g., the hole 221 of FIGS. 7A and 7B) into which the screw 240 is inserted at least partially overlaps the first screw hole 211 of the first boss 210 when the first surface 151 is viewed in the z-axis direction.

Referring to FIG. 5A, in an embodiment, the reinforcing member 220 may surround part of the extending portion 210*b* of the first boss 210 that is exposed on the first surface 151 of the first circuit board 150. In an embodiment, the reinforcing member 220 may have a predetermined height to form substantially the same plane as that of the extending portion 210*b*. In an embodiment, a head 242 of the screw 240 may be disposed on the same plane, for example. In various embodiments, the hole (e.g., the hole 221 of FIGS. 7A and 7B) of the reinforcing member 220 may be defined in substantially the same size as the first through-hole 159.

Referring to FIG. 5B, in an embodiment, one portion of the reinforcing member 220 may be disposed between the head 242 of the screw 240 and the first circuit board 150, and another portion of the reinforcing member 220 may be disposed between the head 242 of the screw 240 and the extending portion 210*b*. In an embodiment, the reinforcing member 220 may be disposed on the same plane formed by the first circuit board 150 and the extending portion 210*b*, for example. In various embodiments, the hole (e.g., the hole 221 of FIGS. 7A and 7B) of the reinforcing member 220 may be defined in a size smaller than that of the first through-hole 159. In an embodiment, the hole of the reinforcing member 220 may be defined in substantially the same size as the first screw hole 211 of the first boss 210, for example.

In an embodiment, the reinforcing member 220 may press the first surface 151 of the first circuit board 150 toward the plate structure 121 as the screw 240 is fastened to the first screw hole 211 of the first boss 210. The first circuit board 150 may be stably disposed between the stepped surface 212 of the support portion 210*a* and the reinforcing member 220.

In an embodiment, the second boss 230 may protrude from the plate structure 121 of the housing 120 toward the second circuit board 160. The second boss 230 may be unitary with the plate structure 121 of the housing 120 as one body, or may be coupled to the plate structure 121. In an embodiment, a second screw hole 231 into which at least a portion of a screw 240 is inserted may be defined in the second boss 230. In an embodiment, the second boss 230 may be coupled with the second circuit board 160 such that the second screw hole 231 and a second through-hole 169 penetrating the second circuit board 160 are at least partially aligned with each other.

Referring to FIG. 5A, corresponding threads that correspond to threads of the screw 240 may be formed on the inner surface of the second screw hole 231 and the inner surface of the second through-hole 169. In an embodiment, the second circuit board 160 may be stably disposed between a head 242 of the screw 240 and the second boss 230.

Referring to FIG. 5B, the second boss 230 may include a second support portion 230*a* supporting the second surface 162 of the second circuit board 160 and a second extending portion 230*b* extending from the second support portion 230*a* and passing through the second through-hole 169 of the second circuit board 160. In an embodiment, a size of the second support portion 230*a* may be larger than a size of the second extending portion 230*b*. In an embodiment, the second extending portion 230*b* may be formed in a size corresponding to the second through-hole 169, and a size of the second support portion 230*a* may be larger than a size of the second through-hole 169 of the second circuit board 160, for example. The second extending portion 230*b* may extend from the second support portion 230*a* with a step. A second stepped surface 232 may be formed on the second support portion 230*a*. In an embodiment, the second stepped surface 232 may support the second surface 162 of the second circuit board 160, for example.

Referring to FIG. 5B, the second extending portion 230*b* may be disposed in the second through-hole 169 so as not to protrude from the first surface 161 of the second circuit board 160. In an embodiment, the second extending portion 230*b* may be a guide for temporarily fixing the position of the second circuit board 160 before the screw 240 is fastened, for example. In various embodiments, the second extending portion 230*b* may form the same plane as that of the first surface 161 of the second circuit board 160. The head 242 of the screw 240 may be disposed on the same plane. In various embodiments, a size of the second screw hole 231 may be smaller than a size of the second through-hole 169 of the second circuit board 160.

In various embodiments, the first electric elements 158 may be disposed adjacent to the first boss 210. The first electric elements 158 may include various parts disposed on the first surface 151 and/or the second surface 152 of the first circuit board 150.

In an embodiment, the first electric elements 158 may include at least one of a processor (e.g., integrated circuit (IC)), a resistor, a capacitor, a shield can, or a connector, for example.

In various embodiments, the second electric elements 168 may be disposed adjacent to the second boss 230. The second electric elements 168 may include various parts disposed on the first surface 161 and/or the second surface 162 of the second circuit board 160.

In an embodiment, the second electric elements 168 may include an external interface module (e.g., the external interface module 167 of FIG. 2) that performs an interface function, for example. In an embodiment, the external interface module may include a USB connection module and/or an earphone insertion terminal, for example.

In another embodiment, the second electric elements 168 may include a speaker module and/or a sensor module (e.g., a fingerprint sensor).

In various embodiments, the first electric elements 158 may be disposed on the first surface 151 and/or the second surface 152 of the first circuit board 150. In an embodiment, a first electric element 158a disposed on the first surface 151 may have a first height in the z-axis direction, and a first electric element 158b disposed on the second surface 152 may have a second height smaller than the first height in the −z-axis direction, for example. In other words, a relatively thick electric element may be disposed on the first surface 151 of the first circuit board 150.

In various embodiments, the second electric elements 168 may be disposed on the first surface 161 and/or the second surface 162 of the second circuit board 160. In an embodiment, a first electric element 168a disposed on the first surface 161 may have a third height in the z-axis direction, and a first electric element 168b disposed on the second surface 162 may have a fourth height greater than the third height in the −z-axis direction, for example. In other words, a relatively thick electric element may be disposed on the second surface 162 of the second circuit board 160.

In an embodiment, the extending portion 210b of the first boss 210 may extend to a predetermined height from the support portion 210a so as to be fastened with the screw 240 with a sufficient length. That is, the extending portion 210b may extend the first screw hole 211 fastened with the screw 240.

Considering a comparative example not including the reinforcing member 220, the first circuit board 150 may be disposed at a relatively small height from the plate structure 121, and the first boss 210 may have a relatively small height up to the first circuit board 150. The first boss 210 having a small height cannot be coupled with the screw 240 to a sufficient length. In this case, the first circuit board 150 and the housing 120 cannot be firmly coupled, or another type of screw (e.g., a shorter screw) for fixing the first circuit board 150 may be desired. The other type of screw may further complicate an assembly process of the electronic device 100.

The fixing structure 200 of the electronic device 100 in an embodiment may include the first boss 210 further including the extending portion 210b penetrating the first circuit board 150 and the reinforcing member 220 disposed between the head 242 of the screw 240 and the first circuit board 150 and thus may provide a sufficient coupling length of the screw 240 and the first boss 210. Accordingly, the first circuit board 150 may be stably fixed between the reinforcing member 220 and the support portion 210a of the first boss 210.

In this case, the coupling length of the screw 240 may mean the length of a portion of the screw 240 (e.g., a body 241 of FIG. 8) inserted into each of the first boss 210 and the second boss 230. In an alternative embodiment, the coupling length of the screw 240 may mean the number of revolutions of threads 243 (e.g., threads 243 of FIG. 8) and corresponding threads. In the illustrated embodiment, the screw 240 may be inserted into each of the first boss 210 and the second boss 230 by substantially the same length. This may mean that the first circuit board 150 and the second circuit board 160 are fixed with a uniform fixing force.

In an embodiment, each of the first circuit board 150 and the second circuit board 160 may have a predetermined height difference Δh from the plate structure 121 or the rear surface of the electronic device 100. In this case, the first circuit board 150 at a lower height than the second circuit board 160 may have a smaller screw coupling length than the second circuit board 160. The fixing structure 200 of the electronic device 100 in an embodiment may be configured such that the first circuit board 150 and the second circuit board 160 have substantially the same screw coupling length. In an embodiment, referring to FIG. 5A, the extending portion 210b may protrude from the first surface 151 of the first circuit board 150 by the height difference Δh, for example. Furthermore, in various embodiments, the reinforcing member 220 may have a height (e.g., a length in the z-axis direction) corresponding to the height difference Δh so as to contact the head 242 together with the extending portion 210b.

Figure 7A:
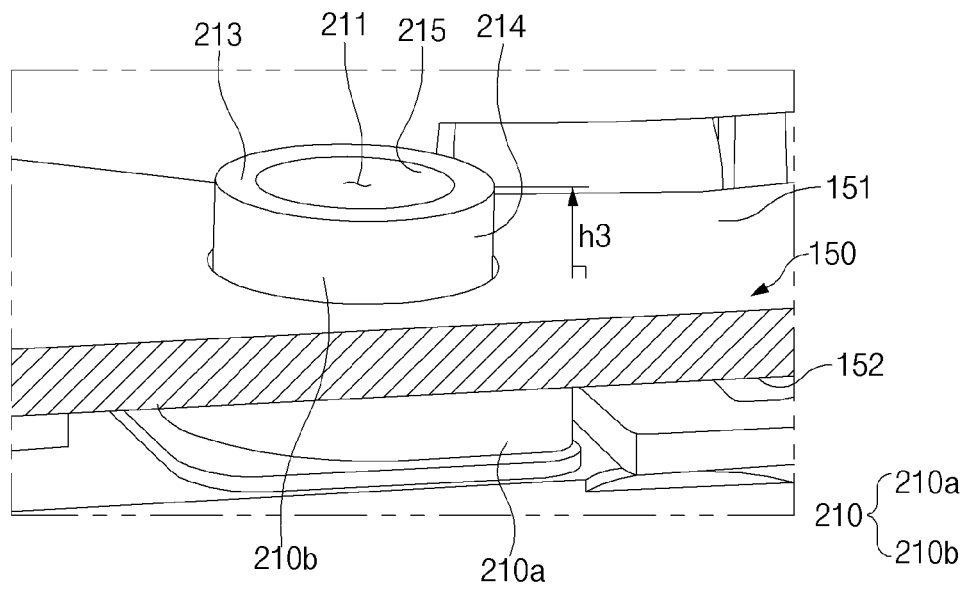
FIGS. 7A and 7B are views illustrating an embodiment of the fixing structure of the electronic device.
Figure 7B:
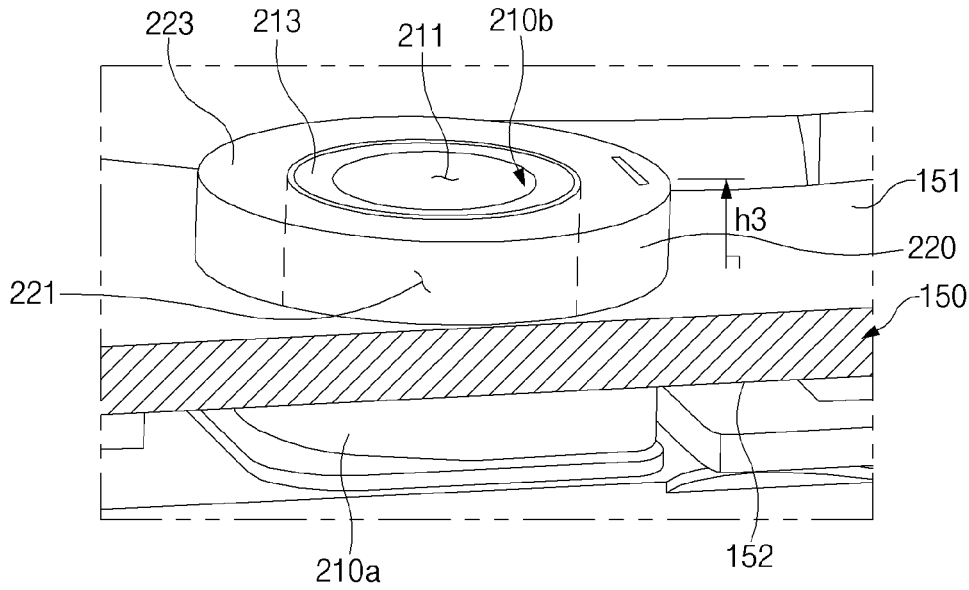

FIGS. 7A and 7B are views illustrating an embodiment of the fixing structure of the electronic device.

Referring to FIGS. 7A and 7B, the first boss 210 may include the support portion 210a supporting the second surface 152 of the first circuit board 150 and the extending portion 210b passing through the first circuit board 150. The extending portion 210b may extend above the first surface 151 of the first circuit board 150 (e.g., in the +z-axis direction) through the first through-hole 159 of the first circuit board 150. In an embodiment, the extending portion 210b may extend to a third height h3 from the first surface 151 of the first circuit board 150, for example.

In an embodiment, the first boss 210 may include the first screw hole 211 into which the screw 240 is inserted. Threads may be formed on an inner circumferential surface 215 of the first boss 210. The reinforcing member 220 may be disposed on an outer circumferential surface 214 of the first boss 210.

In various embodiments, the third height h3 may be substantially the same as a height difference (e.g., the height difference Δh of FIGS. 5A and 5B) between the first circuit board 150 and the second circuit board 160. Accordingly, the screw coupling length of the first boss 210 and the screw coupling length of the second boss 230 may be substantially the same as each other.

In various embodiments, the reinforcing member 220 may surround the extending portion 210b of the first boss 210. An upper surface 223 of the reinforcing member 220 may form substantially the same plane as that of an upper surface 213 of the extending portion 210b. The head of the screw (e.g., the head 242 of FIGS. 5A and 5B) may be disposed on the upper surface 223 of the reinforcing member 220 and the upper surface 213 of the extending portion 210b. To this end, in various embodiments, the reinforcing member 220 may protrude to the third height h3 from the first surface 151 of the first circuit board 150.

In an embodiment, the reinforcing member 220 may be coupled to the first circuit board 150. In an embodiment, the reinforcing member 220 may be surface disposed (e.g., mounted) on the first circuit board 150, for example. In an embodiment, the reinforcing member 220 may include a metallic material and may be soldered on a metal region of the first circuit board 150, for example.

Figure 8:
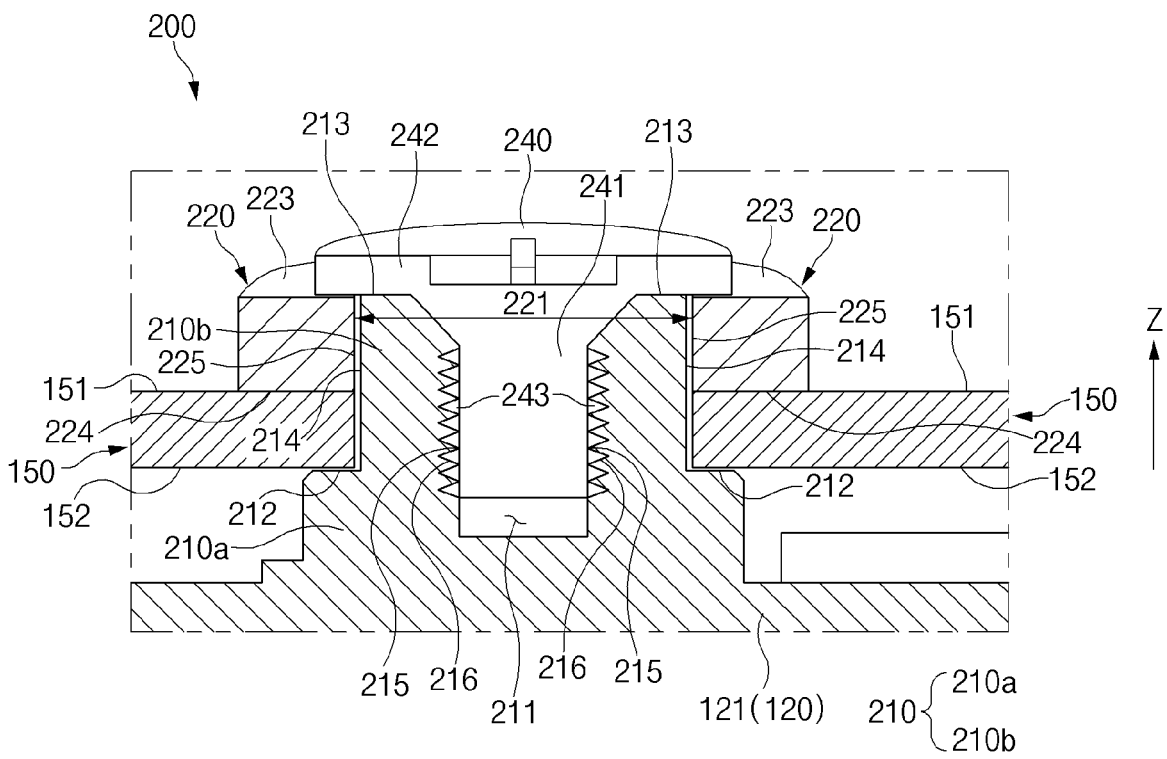
FIG. 8 is a cross-sectional view of an embodiment of the fixing structure of the electronic device.

FIG. 8 is a cross-sectional view of an embodiment of the fixing structure of the electronic device.

In an embodiment, the first boss 210 may include the support portion 210a protruding from the plate structure 121, the extending portion 210b extending from the support portion 210a, and the first screw hole 211 penetrating the support portion 210a and at least part of the extending portion 210b. The stepped surface 212 may be formed between the extending portion 210b and the support portion 210a. The stepped surface 212 may support the second surface 152 of the first circuit board 150. Corresponding threads 216 with which the threads 243 of the screw 240 are engaged may be formed on the inner circumferential surface 215 of the first screw hole 211. In various embodiments, an inner circumferential surface 225 of the reinforcing member 220 may be disposed on the outer circumferential surface 214 of the extending portion 210b. In various embodiments, the outer circumferential surface 214 of the extending portion 210b may be press-fit into the inner circumferential surface 225 of the reinforcing member 220, for example.

In an embodiment, the screw 240 may include the head 242, the body 241, and the threads 243 formed on the body 241. At least a portion of the head 242 may contact the reinforcing member 220. In an embodiment, the head 242 may contact the upper surface 213 of the extending portion 210b and the upper surface 223 of the reinforcing member 220, for example. In an embodiment, the screw 240 may move toward the plate structure 121 as the threads 243 of the body 241 are engaged with the corresponding threads 216 of the first screw hole 211. In an embodiment, the screw 240 may move in the −z-axis direction while rotating along the corresponding threads 216, for example. At this time, the head 242 may press the reinforcing member 220 toward the first circuit board 150. The first surface 151 may be pressed by a lower surface 224 of the reinforcing member 220, and the second surface 152 may be supported by the stepped surface 212. Accordingly, the first circuit board 150 may be stably fixed.

In an embodiment, the reinforcing member 220 may include the hole 221 into which the extending portion 210b of the first boss 210 is inserted. The hole 221 may have a size corresponding to or smaller than the size of the extending portion 210b of the first boss 210. In the case in which the hole 221 has a smaller size than the extending portion 210b of the first boss 210, the first boss 210 may be press-fit into the reinforcing member 220.

The fixing structure 200 in embodiments of the disclosure may include the first boss 210 having at least one portion penetrating the first circuit board 150 and another portion formed to support the first circuit board 150 and the reinforcing member 220 that is coupled to the first boss 210 and that presses the first circuit board 150. Accordingly, the fixing structure 200 may provide a sufficient first coupling length of the screw 240 and the first boss 210 between the first circuit board 150 and the plate structure 121 that have a relatively small gap therebetween.

Furthermore, the first coupling length may correspond to a second coupling length of the second boss 230 and the screw 240. Accordingly, the first circuit board 150 and the second circuit board 160 may have a substantially uniform coupling stiffness.

Figure 9A:
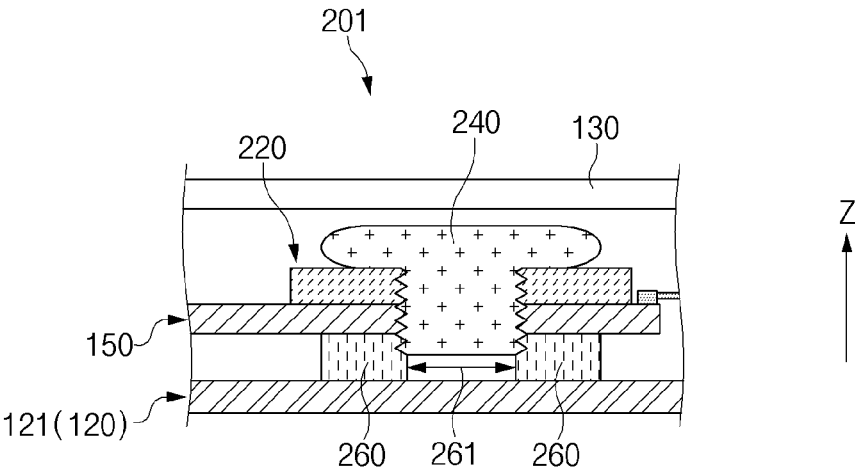
FIGS. 9A and 9B are cross-sectional views of another embodiment of a second fixing structure of the electronic device.
Figure 9B:
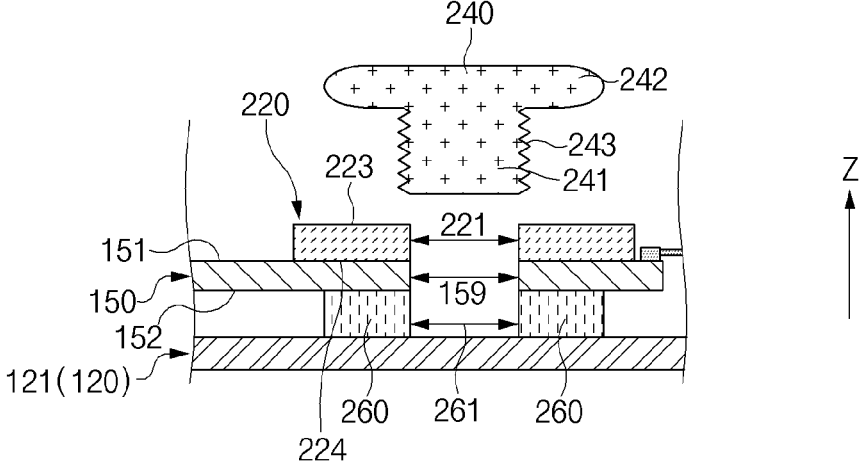

FIGS. 9A and 9B are cross-sectional views of another embodiment of a second fixing structure of the electronic device.

In the illustrated embodiment, the second fixing structure 201 may include a third boss 260 extending from the plate structure 121 of the housing 120, a first circuit board 150 disposed on the third boss 260, a reinforcing member 220 disposed on the first circuit board 150, and a screw 240.

In an embodiment, the third boss 260 may protrude from the plate structure 121 of the housing 120 toward the first circuit board 150. The third boss 260 may contact a second surface 152 of the first circuit board 150. A third hole 261 may be defined in the third boss 260. The third hole 261 may be at least partially aligned with a first through-hole 159 of the first circuit board 150. Corresponding threads with which threads 243 of the screw 240 are engaged may be formed on at least a portion of the inner circumferential surface of the third hole 261.

In an embodiment, at least a portion of an upper surface 223 of the reinforcing member 220 may contact a head 242, and a lower surface 224 of the reinforcing member 220 may be disposed on the first circuit board 150 to contact the first circuit board 150. In an embodiment, the reinforcing member 220 may be disposed on the first circuit board 150 such that a hole 221 is aligned with the first through-hole 159 of the first circuit board 150, for example. Corresponding threads that correspond to the threads 243 of the screw 240 may be formed on at least a portion of the hole 221 of the reinforcing member 220. In various embodiments, the hole 221 of the reinforcing member 220, the first through-hole 159 of the first circuit board 150, and the third hole 261 may have substantially the same diameter. Corresponding threads may be formed on the inner circumferential surfaces of the hole 221, the first through-hole 159, and the third hole 261. The corresponding threads may be continuously connected.

In an embodiment, as the threads 243 of the screw 240 are engaged with the corresponding threads, the head 242 of the screw 240 may press the upper surface 223 of the reinforcing member 220 in the −z-axis direction, and the lower surface 224 of the reinforcing member 220 may press the first circuit board 150 in the −z-axis direction. A first surface 151 of the first circuit board 150 may be pressed by the reinforcing member 220 in the −z-axis direction, and the second surface 152 of the first circuit board 150 may be pressed by the third boss 260 in the +z-axis direction. Accordingly, the first circuit board 150 may be stably fixed to the plate structure 121 of the housing 120.

Although the electronic device 100 of a bar type or a plate type is illustrated in the drawings, the electronic device in embodiments of the disclosure is not limited thereto. In an embodiment, the electronic device 100 may include electronic devices of various form factors, for example. In an embodiment, a rollable electronic device or a foldable electronic device may include the circuit boards 150 and 160 and the fixing structure 200, for example.

The "rollable electronic device" may mean an electronic device configured such that at least a partial region of a display 101 forms a surface (e.g., a front surface) of the electronic device (an extended state) or is received in the housing (e.g., the housing 110 of FIG. 1) (a default state). In an embodiment, a partial region of the display may be rolled, for example. The rollable electronic device may provide a wider screen to a user in the extended state and may provide portability to the user in the default state.

The "foldable electronic device" may mean an electronic device including a display 101, a partial region of which is deformable to be flat or curved. In an embodiment, the foldable electronic device may include a flat state in which the display is flat and a folded state in which a partial region of the display is curved, for example. The foldable electronic device may provide a wider screen to a user in the flat state and may provide portability to the user in the folded state.

In some embodiments, the electronic device in various embodiments of the disclosure may be construed as including not only a portable electronic device such as a smartphone but also various other electronic devices such as a notebook computer or a home appliance.

An electronic device 100 in embodiments of the disclosure may include a housing 120, a display module 130 that is disposed in the housing 120 and that constitutes a portion of a surface of the electronic device 100, a first circuit board 150 that is disposed in the housing 120 and that includes a first surface 151 that faces toward the display module 130 and a second surface 152 opposite to the first surface 151, and a fixing structure 200 that fixes the first circuit board 150 to the housing. The fixing structure 200 may include a first boss 210 that protrudes from an inner surface of the housing 120 toward the first circuit board 150 and that defines a first screw hole 211, a reinforcing member 220 disposed on the first circuit board 150, and a screw 240 that penetrates the first boss 210 and the reinforcing member 220. The first boss 210 may include a support portion 210a that supports the second surface 152 of the first circuit board 150 and an extending portion 210b that extends from the support portion 210a such that at least part of the extending portion 210b protrudes from the first surface of the first circuit board 150. The reinforcing member 220 may press the first surface 151 of the first circuit board 150.

In various embodiments, the first circuit board 150 may define a first through-hole 159 that penetrates the first surface 151 and the second surface 152, and the extending portion 210b of the first boss 210 may extend to the first surface 151 of the first circuit board 150 through the first through-hole 159.

In various embodiments, a size of the support portion 210a may be larger than a size of the first through-hole 159, the extending portion 210b may extend from the support portion 210a with a step to pass through the first through-hole 159, and a stepped surface 212 that contacts the second surface 152 of the first circuit board 150 may be formed on the support portion 210a.

In various embodiments, the reinforcing member 220 may be surface disposed (e.g., mounted) on the first surface 151 of the first circuit board 150.

In various embodiments, the screw 240 may include a body 241 having threads formed thereon, at least a portion of the body being disposed in the first screw hole 211, and a head 242 that extends from the body and presses the reinforcing member 220. At least a portion of the reinforcing member 220 may be disposed between the head 242 and the first circuit board 150.

In various embodiments, upper surfaces that face toward the display module may be defined on the reinforcing member 220 and the first boss 210, respectively, and the upper surface 223 of the reinforcing member 220 and the upper surface 213 of the first boss 210 may form substantially the same plane such that the head 242 of the screw 240 is disposed thereon.

In various embodiments, a hole 221 through which at least part of the extending portion 210b passes may be defined in the reinforcing member 220, and the hole 221 may be defined in a size greater than or equal to a size of the extending portion 210b.

In various embodiments, the electronic device may further include a second circuit board 160 disposed in the housing 120 and spaced apart from the first circuit board 150. A second through-hole 160 may be defined in the second circuit board 160. The fixing structure 200 may include a second boss 230 that protrudes toward the second circuit board 160 and defines a second screw hole 231 at least partially aligned with the second through-hole 169. Corresponding threads with which threads of the screw 240 are engaged may be defined in the second screw hole 231. The first boss 210 may protrude longer than the second boss 230.

In various embodiments, the screw may be inserted into the first screw hole 211 of the first boss 210 by a first length, and the screw may be inserted into the second screw hole 231 of the second boss 230 by a second length substantially the same as the first length.

In various embodiments, the first circuit board 150 may be disposed at a first height from the inner surface of the housing, and the second circuit board 160 may be disposed at a second height greater than the first height from the inner surface of the housing.

In various embodiments, the extending portion 210b may protrude to a third height from the first surface 151 of the first circuit board 150, and the third height may correspond to a height difference between the second height and the first height.

In various embodiments, the first circuit board 150 may form a first gap with the display module 130, and the second circuit board 160 may form a second gap smaller than the first gap with the display module 130.

In various embodiments, the screw 240 may be configured such that a head 242 presses a surface 161 of the second circuit board 160, and at least some of the threads of the screw 240 may be fastened to the second through-hole 169 of the second circuit board 160.

In various embodiments, the electronic device may further include a flexible circuit board 170 that electrically connects the first circuit board 150 and the second circuit board 160 and a battery 125 disposed between the first circuit board 150 and the second circuit board 160. At least a portion of the flexible circuit board 170 may extend between the battery 125 and the display module 130.

In various embodiments, at least a portion of the flexible circuit board 170 may overlap the second circuit board 160 when the first circuit board 150 and the second circuit board 160 are viewed from above (i.e., in a plan view).

In various embodiments, the flexible circuit board 170 may include a first connector 171 coupled to the first circuit board 150 and a second connector 172 coupled to the second circuit board 160. The second circuit board 160 may include a first surface 161 that faces toward the display module 130 and a second surface 162 opposite to the first surface 161. The first connector 171 may be coupled to the first surface 151 of the first circuit board 150, and the second connector 172 may be coupled to the second surface 162 of the second circuit board 160.

An electronic device in embodiments of the disclosure may include a housing 120, a display module 130 that is disposed in the housing 120 and that constitutes a portion of a surface of the electronic device 100, a first circuit board 150 that is disposed in the housing 120 and that includes a first surface 151 that faces toward the display module 130 and a second surface 152 opposite to the first surface 151, and a fixing structure 200 that fixes the first circuit board 150 to the housing 120. The fixing structure 200 may include a first boss 210 that protrudes from an inner surface of the housing toward the first circuit board 150 and defines a first screw hole 211, a reinforcing member 220 that is disposed on the first surface 151 of the first circuit board 150 and that defines a first hole 221 that at least partially overlaps the first screw hole 211 of the first boss 210 when the first surface 151 is viewed from above, and a screw 240 that passes through the first screw hole 211 and the first hole 221. The screw 240 may be configured such that a head 242 presses the reinforcing member 220.

In various embodiments, the electronic device may further include a second circuit board 160 disposed in the housing 120 and spaced apart from the first circuit board 150 and a flexible circuit board 170 that electrically connects the second circuit board 160 and the first circuit board 150. The second circuit board 160 may include a first surface 162 that faces toward the display module 130 and a second surface 162 opposite to the first surface 161. The second surface 152 of the first circuit board 150 may have a first height from the inner surface of the housing 120. The second surface of the second circuit board may have a second height greater than the first height from the inner surface of the housing 120. The flexible circuit board 170 may extend from the first surface 151 of the first circuit board 150 to the second surface 162 of the second circuit board 160. The fixing structure 200 may further include a second boss 230 that protrudes from the inner surface of the housing 120 toward the second circuit board 160 and defines a second screw hole 231 to which the screw 240 is fastened.

An electronic device 100 in embodiments of the disclosure may include a housing 120, a display module 130 that is disposed in the housing 120 and that constitutes a portion of a surface of the electronic device 100, a first circuit board 150 that is disposed in the housing 120 and that includes a first surface 151 that faces toward the display module 130 and a second surface 152 opposite to the first surface 151. A first through-hole 159 penetrating the first surface 151 and the second surface 152 may be defined in the first circuit board 150. The electronic device 100 may further include a fixing structure 200 that fixes the first circuit board 150 to the housing 120. The fixing structure 200 may include a first boss 210 that protrudes from an inner surface of the housing 120 toward the first circuit board 150 and supports at least a partial region of the second surface 152 of the first circuit board 150, a reinforcing member 220 disposed on the first surface 151 of the first circuit board 150, and a screw 240. A first screw hole 211 at least partially aligned with the first through-hole 159 may be defined in the first boss 210. A first hole 221 at least partially aligned with the first through-hole 159 and smaller than the first through-hole 159 may be defined in the reinforcing member 220. The screw 240 may be fastened to the first hole 221 and the first screw hole 211.

In various embodiments, the first boss 210 may include a support portion 210a that supports the second surface 152 of the first circuit board 150 and an extending portion 210b disposed in the first through-hole 159 of the first circuit board 150. The extending portion 210b may form substantially the same plane as that of a region around the first through-hole 159.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other features (e.g., importance or order). It is to be understood that when an element (e.g., a first element) is referred to, with or without the term "operatively" or "communicatively", as "coupled with," "coupled to," "connected with, "or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, e.g., "logic," "logic block," "part," or "circuitry". A module may be a single integral component, or a minimum unit or part thereof, adapted to perform one or more functions. In an embodiment, the module may be implemented in a form of an application-specific integrated circuit (ASIC), for example.

Various embodiments as set forth herein may be implemented as software including one or more instructions that are stored in a storage medium that is readable by a machine. In an embodiment, a processor of the machine may invoke at least one of the one or more instructions stored in the storage medium, and execute it, with or without using one or more other components under the control of the processor, for example. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In an embodiment, a method in various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

In various embodiments, each component (e.g., a module or a program) of the above-described components may include a single entity or multiple entities, and some of the multiple entities may be separately disposed in different components. In various embodiments, one or more of the above-described components may be omitted, or one or more other components may be added. In an alternative embodiment or additionally, a plurality of components (e.g., modules or programs) may be integrated into a single component. In such a case, in various embodiments, the integrated component may still perform one or more functions of each of the plurality of components in the same or similar manner as they are performed by a corresponding one of the plurality of components before the integration. In various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing;
a display module disposed in the housing and constituting a portion of a surface of the electronic device;
a first circuit board disposed in the housing, the first circuit board including a first surface which faces toward the display module and a second surface oppo-
site to the first surface; and a fixing structure which fixes the first circuit board to the
housing, the fixing structure including:

a first boss which protrudes from an inner surface of the
housing toward the first circuit board and in which a
first screw hole is defined, the first boss including:

a support portion which supports the second surface
of the first circuit board; and an extending portion which extends from the support
portion such that at least part of the extending
portion protrudes from the first surface of the first
circuit board;

a reinforcing member disposed on the first circuit
board; and a screw which penetrates the first boss and the rein-
forcing member, wherein the reinforcing member presses the first surface
of the first circuit board.

2. The electronic device of claim 1, wherein a first
through-hole which penetrates the first surface and the
second surface is defined in the first circuit board, and wherein the extending portion of the first boss extends to
the first surface of the first circuit board through the first
through-hole.

3. The electronic device of claim 2, wherein a size of the
support portion is larger than a size of the first through-hole, wherein the extending portion extends from the support
portion with a step to pass through the first through-
hole, and wherein a stepped surface which contacts the second
surface of the first circuit board is formed on the
support portion.

4. The electronic device of claim 1, wherein the reinforc-
ing member is mounted on the first surface of the first circuit
board.

5. The electronic device of claim 1, wherein the screw
includes a body having threads formed thereon, at least a
portion of the body being disposed in the first screw hole,
and a head which extends from the body and press the
reinforcing member, and wherein at least a portion of the reinforcing member is
disposed between the head and the first circuit board.

6. The electronic device of claim 5, wherein the reinforc-
ing member and the first boss respectively include upper
surfaces which face toward the display module, and wherein the upper surface of the reinforcing member and
the upper surface of the first boss form substantially a
same plane such that the head of the screw is disposed
thereon.

7. The electronic device of claim 1, wherein a hole
through which at least part of the extending portion passes
is defined in the reinforcing member, and the hole is defined
in a size greater than or equal to a size of the extending
portion.

8. The electronic device of claim 1, further comprising:

a second circuit board disposed in the housing and spaced
apart from the first circuit board, wherein a second through-hole is defined in the second
circuit board, wherein the fixing structure includes a second boss which
protrudes toward the second circuit board, the second
boss defining a second screw hole at least partially
aligned with the second through-hole, wherein corresponding threads with which threads of the
screw are engaged are formed in the second screw hole,
and wherein the first boss protrudes longer than the second
boss.

9. The electronic device of claim 8, wherein the screw is
inserted into the first screw hole of the first boss by a first
length, and wherein the screw is inserted into the second screw hole
of the second boss by a second length substantially
identical to the first length.

10. The electronic device of claim 8, wherein the first
circuit board is disposed at a first height from the inner
surface of the housing, and wherein the second circuit board is disposed at a second
height greater than the first height from the inner
surface of the housing.

11. The electronic device of claim 10, wherein the extend-
ing portion is formed to protrude to a third height from the
first surface of the first circuit board, and wherein the third height corresponds to a height difference
between the second height and the first height.

12. The electronic device of claim 8, wherein the first
circuit board forms a first gap with the display module, and wherein the second circuit board forms a second gap
smaller than the first gap with the display module.

13. The electronic device of claim 8, wherein the screw is
configured such that a head presses the first surface of the
second circuit board, and wherein at least some of the threads of the screw are
fastened to the second through-hole of the second
circuit board.

14. The electronic device of claim 8, further comprising:

a flexible circuit board which electrically connects the
first circuit board and the second circuit board; and a battery disposed between the first circuit board and the
second circuit board, wherein at least a portion of the flexible circuit board
extends between the battery and the display module.

15. The electronic device of claim 14, wherein at least a
portion of the flexible circuit board overlaps the second
circuit board in a plan view.

16. The electronic device of claim 14, wherein the flexible
circuit board includes a first connector coupled to the first
circuit board and a second connector coupled to the second
circuit board, wherein the second circuit board includes a first surface
which faces toward the display module and a second
surface opposite to the first surface, wherein the first connector is coupled to the first surface
of the first circuit board, and wherein the second connector is coupled to the second
surface of the second circuit board.

17. An electronic device comprising:

a housing;

a display module disposed in the housing and constituting
a portion of a surface of the electronic device;

a first circuit board disposed in the housing, the first
circuit board including a first surface which faces
toward the display module and a second surface oppo-
site to the first surface; and a fixing structure which fixes the first circuit board to the
housing, the fixing structure including:

a first boss formed to protrude from an inner surface of
the housing toward the first circuit board, the first
boss including a first screw hole;

a reinforcing member which is disposed on the first
surface of the first circuit board, the reinforcing
member defining a first hole which at least partially overlaps the first screw hole of the first boss when the first surface is viewed from above; and a screw which passes through the first screw hole and the first hole, wherein the screw is configured such that a head presses the reinforcing member.

18. The electronic device of claim 17, further comprising:

a second circuit board disposed in the housing and spaced apart from the first circuit board; and a flexible circuit board which electrically connects the second circuit board and the first circuit board, wherein the second circuit board includes a first surface which faces toward the display module and a second surface opposite to the first surface, wherein the second surface of the first circuit board has a first height from the inner surface of the housing, wherein the second surface of the second circuit board has a second height greater than the first height from the inner surface of the housing, wherein the flexible circuit board extends from the first surface of the first circuit board to the second surface of the second circuit board, and wherein the fixing structure further includes a second boss formed to protrude from the inner surface of the housing toward the second circuit board, the second boss defining a second screw hole to which the screw is fastened.

19. An electronic device comprising:

a housing;

a display module disposed in the housing and constituting a portion of a surface of the electronic device;

a first circuit board disposed in the housing, the first circuit board including a first surface which faces toward the display module and a second surface opposite to the first surface, the first circuit board defining a first through-hole which penetrates the first surface and the second surface; and a fixing structure which fixes the first circuit board to the housing, the fixing structure including:

a first boss formed to protrude from an inner surface of the housing toward the first circuit board and support at least a partial region of the second surface of the first circuit board;

a reinforcing member disposed on the first surface of the first circuit board; and a screw, wherein a first screw hole at least partially aligned with the first through-hole is defined in the first boss, wherein a first hole at least partially aligned with the first through-hole and smaller than the first through-hole is defined in the reinforcing member, and wherein the screw is fastened to the first hole and the first screw hole.

20. The electronic device of claim 19, wherein the first boss includes a support portion which supports the second surface of the first circuit board and an extending portion disposed in the first through-hole of the first circuit board, and wherein the extending portion forms substantially a same plane as a plane of a region around the first through-hole.

* * * * *